(12) United States Patent
Nadj et al.

(10) Patent No.: US 7,424,474 B2
(45) Date of Patent: *Sep. 9, 2008

(54) DATA STRUCTURE AND METHOD FOR SORTING USING HEAP-SUPERNODES

(75) Inventors: Paul Nadj, Ottawa (CA); David W. Carr, Nepean (CA); Edward D. Funnekotter, Ottawa (CA)

(73) Assignee: Altera Corporation, San Jose, CA (US)

( * ) Notice: Subject to any disclaimer, the term of this patent is extended or adjusted under 35 U.S.C. 154(b) by 351 days.

This patent is subject to a terminal disclaimer.

(21) Appl. No.: 11/206,422

(22) Filed: Aug. 17, 2005

(65) Prior Publication Data

US 2006/0004897 A1    Jan. 5, 2006

Related U.S. Application Data

(63) Continuation of application No. 09/728,147, filed on Nov. 28, 2000, now Pat. No. 6,952,696.

(51) Int. Cl.
*G06F 17/30* (2006.01)

(52) U.S. Cl. .......................................................... 707/8

(58) Field of Classification Search ...................... 707/2, 707/7, 8, 102, 216, 3, 224
See application file for complete search history.

(56) References Cited

U.S. PATENT DOCUMENTS 6,952,696 B1 * 10/2005 Nadj et al. ..................... 707/8

* cited by examiner

*Primary Examiner*—Etienne P LeRoux
(74) *Attorney, Agent, or Firm*—Martine Penilla & Gencarella, LLP

(57) ABSTRACT

An improved data structure is provided by modifying a public-domain data structure known as a "heap". When these improvements are applied, the resultant data structure is known as a "pile." This invention further described a pipelined hardware implementation of a pile. Piles offer many advantages over heaps: they allow for fast, pipelined hardware implementations with increased throughput, making piles practical for a wide variety of new applications; they remove the requirement to track and update the last position in the heap; they reduce the number of memory reads accesses required during a delete operation; they require only ordinary, inexpensive RAM for storage in a fast, pipelined implementation; and they allow a random mixture of back-to-back insert, remove, and swap operations to be performed without stalling the pipeline.

17 Claims, 13 Drawing Sheets

|  | time ----------> | | | | | | | | | | | | | | | | | |
|---|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 16 | 17 | 18 |
| Read Level 1 RAM | A | | | | | | B | | | | | | | | | | | |
| Write Level 1 RAM | | | | | A | | | | | | | B | | | | | | |
| Level A Comparisons | | | A | A | | | | | | B | B | | | | | | | |
| Read Level 2 RAM | | A | | | | | | B | | | | | | | | | | |
| Write Level 2 RAM | | | | | | A | | | | | | | B | | | | | |
| Level B Comparisons | | | | A | A | | | | | | B | B | | | | | | |
| Read Level 3 RAM | | | | A | | | | | | B | | | | | | | | |
| Write Level 3 RAM | | | | | | | A | | | | | | | | B | | | |
| Level C Comparisons | | | | | | A | A | | | | | | B | B | | | | |
| Read Level 4 RAM | | | | | | A | | | | | | B | | | | | | |
| Write Level 4 RAM | | | | | | | | A | | | | | | | B | | | |

FIGURE 10

DATA STRUCTURE AND METHOD FOR SORTING USING HEAP-SUPERNODES

CROSS-REFERENCE TO RELATED APPLICATION

This is a continuation application based on U.S. patent application Ser. No. 09/728,147 filed Nov. 28, 2000, now U.S. Pat. No. 6,952,696, which is herein incorporated by reference in their entirety for all purposes.

BACKGROUND INFORMATION

1. Field of the Invention

The present invention relates to generally to the field of sorting techniques and architectures.

2. Description of Related Art

Data structures known as heaps have been used previously to sort a set of values in ascending or descending order. Rather than storing the values in a fully sorted fashion, the values are "loosely" sorted such that the technique allows simple extraction of the lowest or greatest value from the structure. Exact sorting of the values in a heap is performed as the values are removed from the heap; i.e, the values are removed from the heap in sorted order. This makes a heap useful for sorting applications in which the values must be traversed in sorted order only once.

The properties of a heap data structure are as follows.

P1. A heap is a binary tree, or a k-ary tree where k>2.

P2. A heap is a balanced tree; i.e., the depth of the tree for a set of values is bounded to $\log_k(N)$, where N is the number of elements in the tree, and where k is described above.

P3. The values in a heap are stored such that a parent node is always of higher priority than all of its k descendent nodes. Higher priority means "higher priority to be removed from the heap".

P4. A heap is always left (or right) justified and only the bottom level may contain "holes" (a lack of values) on the right (or left) side of that level.

Property P2 is a reason that heaps are a popular method of sorting in systems where the sorted data must be traversed only once. The bounded depth provides a deterministic search time whereas a simple binary or k-ary tree structure does not.

Property P3 dictates that the root node of the tree always holds the highest priority value in the heap. In other words, it holds the next value to be removed from the heap since values are removed in sorted order. Therefore, repeatedly removing the root node removes the values in the heap in sorted order.

FIG. 1 is a conventional architectural diagram illustrating a tree-based heap data structure 10, with a level 0 of heap, a level 1 of heap, a level 2 of heap, and a level 3 of heap. Tree-like data structures such as heaps are typically depicted and implemented as a series of nodes and pointers to nodes. Each node comprises a value to be sorted. In the level 0 of heap, a node 11 stores a value of 5. In the level 1 of heap, a node 12 stores a value of 22, and a node 13 stores a value of 10. In the level 2 of heap, a node 14 stores a value of 26, a node 15 stores a value of 23, a node 16 stores a value of 24, and a node 17 stores a value of 17. In the level 3 of heap, a node 18 stores a value of 27, and a node 19 stores a value of 38.

FIG. 2 is a conventional architectural diagram illustrating an array-based heap data structure 20. It is well known in the art that balanced trees, such as heaps, may be constructed with arrays. The array-based heap data structure 20 eliminates the need to keep forward and backward pointers in the tree structure.

FIG. 3 is a conventional flow diagram illustrating the process of a heap remove operation 30. Once a root node 11 is removed, a "hole" is created in the root node position 11. To fill the hole in the root node 11, the bottom-most, right-most value (BRV) 12 is removed from the heap and is placed in the hole in the root node 11. Then, the BRV and the k descendent nodes are examined and the highest priority value, if not the BRV itself, is swapped with the BRV. This continues down the heap. This comparison and swapping of values is known as the "percolate" operation.

FIG. 4 is a conventional flow diagram illustrating the process for a heap insert operation 40. To add a value to be sorted into the heap, a slightly different kind of percolate operation is performed. The first hole 41 to the right of the bottom-most, right-most value is identified, and the new value is inserted there. This value is compared to the value in its parent node. If the new value is of higher priority than the parent value, the two values swap places. This continues until the new value is of lower priority, or until the root of the tree is reached. That is, the percolate continues up the tree structure rather than down it.

The described methods of adding and removing values to and from a heap inherently keeps a heap balanced: no additional data structures or algorithms are required to balance a heap. This means that heaps are as space-efficient as binary or k-ary trees even though the worst case operational performance of a heap is better than that of a simple tree.

A third operation is also possible: "swap". A swap operation consists of a remove operation whereby the BRV is not used to fill the resultant hole in the root node 11. Instead, a new value is immediately re-inserted. The percolate operation is performed is identical to the delete case.

Because the percolate operations for remove and for insert traverse the data structure in different directions, parallelism and pipelining of the heap algorithm are inefficient and difficult, respectively.

High-speed implementations of heaps seek to find a way to execute the heap algorithm in hardware rather than in a software program. One such implementation is described in U.S. Pat. No. 5,603,023. This implementation uses a number of so-called "macrocells," each consisting of two storage elements. Each storage element can store one value residing in a heap. The two storage elements in a macrocell are connected to comparison logic such that the greater (or lesser) or the two can be determined and subsequently be output from the macrocell. A single so-called "comparing and rewriting control circuit" is connected to each macrocell so the comparisons between parent nodes and child nodes can be accommodated. In every case, both child nodes of a given parent are in the same macrocell, and the parent is in a different macrocell.

The shortcomings of the heap data structure and of previous implementations are described in the following points:

S1. Efficient pipelined heaps cannot be implemented due to opposing percolate operations.

There are two completely different percolate operations described in the previous section: one is used to remove values from the heap in sorted order, and one is used to insert new values into the heap. The former operation percolates downward from the top of the heap, whereas the latter operation percolates upward from the bottom of the heap.

A pipelined hardware operation is similar to an assembly line in a factory. In a pipelined heap—if such a structure existed—one insertion or removal operation would go through several stages to complete the operation, but another operation would be in the previous stage. Each operation goes through all the stages. I.e., if stage $S_j$ is currently processing operation i, stage $S_{j-1}$ is currently processing operation i+1, stage $S_{j-2}$ is currently processing operation i+2, and so on.

However, since some operations flow through the heap in one direction (e.g., insertion), whereas other operations flow though the heap in the other direction (e.g., removal), an efficient pipeline that supports a mix of the two operations is difficult to construct. This is because a removal operation needs to have current, accurate data in the root node (property P3, section 4.1) before it can begin, but an insertion of a new value percolates from the bottom up (see section 4.1). Thus, an insert operation is executed before a subsequent removal operation can be started. This is the direct opposite of a pipeline.

A unidirectional heap that operates only top-down is in the public domain. To operate in this fashion, the insert operation computes a path through the heap to the first unused value in the heap. Additionally, a simple method is proposed for tracking this first unused position. However, this tracking method assumes that heap property P4 holds. Although this property holds true for a traditional heap, removal of this property is desirable to eliminate shortcoming S2, described below. Thus, a suitable unidirectional heap structure suitable for high-speed pipelining does not exist in the current state of the art.

S2. Pipelined implementations of heaps are difficult to construct in high-speed applications due to the specifics of the "remove & percolate" operation.

The operation that removes values from a heap in sorted order leaves a "hole" in the root node once the highest priority value has been removed. This hole is filled with the bottom-most, right-most value in the heap.

In order to fill the hole caused by a remove operation, a hardware implementation of a heap must read the memory system associated with the current bottom of the tree to get the last value of the tree. This requires (a) that the location of the bottom always be known, and (b) that the all the RAM systems, except the tree root, run faster than otherwise necessary. When the each of the $\log_k(N)$ tree levels of the heap has a dedicated RAM system, the required speedup is two times the speed otherwise required. (Placing the $\log_k(N)$ tree levels of the heap in separate RAMs is the most efficient way to implement a pipelined heap, if such a thing existed, since it has the advantage of using the lowest speed RAMs for any given implementation.)

Point (b) states that "all" memory systems must be faster because the bottom of the heap can appear in any of the $\log_k(N)$ memories.

Point (b) states that the memory must be twice as fast because the RAM is read first to get the value to fill the hole. The RAM may then be written to account for the fact that the value has been removed. Later, if the downward percolation reaches the bottom level, the RAM will be again read and (potentially) written. Thus, a single operation may cause up to 4 accesses to RAM. Only 2 accesses are necessary if the remove operation is optimized to avoid reading and writing the bottom-most level to get the bottom-most, right-most value.

S3. A conventional design may not be fully pipelined. That is, since there is only one "comparing and rewriting control circuit," and since this circuit is required for every parent-child comparison in a percolate operation, it is difficult to have multiple parent-child comparisons from multiple heap-insert or heap-remove operations being processed simultaneously. This means that an insert or remove operation is executed before a new one is started.

S4. A conventional design is structured so that it takes longer to remove values from deeper heaps than from shallower heaps.

S5. A conventional design is incapable of automatically constructing a heap. An external central processor is repeatedly interacting with the design to build a sorted heap. (Once the heap is correctly constructed, however, the values may be removed in order without the intervention of the central processor).

S6. A conventional design employs so called "macrocells" that contain two special memory structures. Each macrocell is connected to a single so called "comparing and rewriting control circuit" that is required to perform the parent-child comparisons required for percolate operations.

This structure means that a macrocell is required for every pair of nodes in the heap, which in turn means that:

The structure does not efficiently scale to large heaps since large quantities of these special memory structures consume more area on a silicon die than would a traditional RAM memory sized to hold the same number of heap values.

The structure is costly to rework into a k-ary heap where k>2 since comparison logic grows more complex with the number of values being compared.

S7. A conventional design does nothing to prevent the painful problem of using a value from the bottom of the heap to fill the root node during a remove operation. The conventional design provides dedicated hardware to facilitate this nuance of heaps.

Accordingly, it is desirable to have a method and structure for a more efficient and flexible processing of a heap data structure.

SUMMARY OF THE INVENTION

The invention discloses a data structure known as a "pile", a method used to manipulate a pile, and a pipelined hardware implementation of a pile. Piles are designed using a heap or heap-like data structure. Heaps are data structures, and the algorithms that operate on these data structures, that are used for sorting values. The benefits of piles are:

B1. In a pile, the percolate operations for both removal and insertion traverse the tree-like structure of the pile in the same direction, which allows a pipelined implementation to be constructed.

B1.1. It is widely understood that a pipelined implementation of a sorting algorithm, of which the pile is a class, performs more removal and insertion operations per unit of time than a non-pipelined implementation.

B1.2. It is obvious to one familiar with heaps that the time to get the result from a remove operation is independent of the depth of the heap. With a pipelined implementation of a heap another remove operation can begin once the first value is removed. This means that the latency of a remove operation is completely independent of the number of size of the heap.

B2. Piles do not require an implementation to access the bottom-most, right-most value in the heap before the percolate for a remove operation begins.

B2.1. This means that the effort expended in tracking the bottom-most, right-most value in a heap can be eliminated in the implementation of a pile.

B2.2. This allows the speed of the RAMs used to implement a pile to be cut in half. Slower RAMs are almost invariably cheaper than faster RAMs. Alternatively, if the speed of the RAMs is not reduced, it allows for a faster hardware implementation than is currently possible.

B4. An implementation of a pile can perform remove and insert operations without the intervention of a central processor.

B5. Conventional external RAM or conventional embedded RAM can be used to store the values in a pile. These RAMs are inexpensive compared to the custom memory cells used in the prior art.

B6. Multiple piles of dynamically changing sizes can exist in the same memory system since a pointer-based implementation of a pile consumes little additional memory.

Piles offer many advantages over heaps: they allow for fast, pipelined hardware implementations with increased throughput, making piles practical for a wide variety of new applications; piles remove the requirement to track and update the last position in the heap; piles reduce the number of memory reads accesses required during a delete operation; they require only ordinary, inexpensive RAM for storage in a fast, pipelined implementation; and they allow a random mixture of back-to-back insert, remove, and swap operations to be performed without stalling the pipeline.

The implementation of pile described herein has many advantages over the state of the art, and over what the advantages of piles vs. heaps otherwise implies: operations can be completed, for example, at fully ½ the speed of the RAM in a sustained fashion, and no intervention by a central processor is required to direct the heap algorithm.

Piles are used for implementing schedulers (e.g., priority queues, weighted fair queuing, traffic shaping). Piles offer a much more memory efficient solution than calendars, the typically implemented scheme for weighted fair queuing and traffic shaping. On high-speed links with many queues, efficient use of memory is required for a workable solution.

Heaps are often used in parallel processing systems to maintain a work queue. The processors consult the work queue when processors are idle so that processors may find additional work to do. Piles are a faster and improved heap that could be used in this application. Dispatching work to processing units a network processor is one aspect of the parallel processing issue described above.

BRIEF DESCRIPTION OF THE DRAWINGS

FIG. 10 is an architectural diagram illustrating a pipeline resource table in accordance with the present invention.

DETAILED DESCRIPTION OF PREFERRED EMBODIMENT(S)

Figure 1:
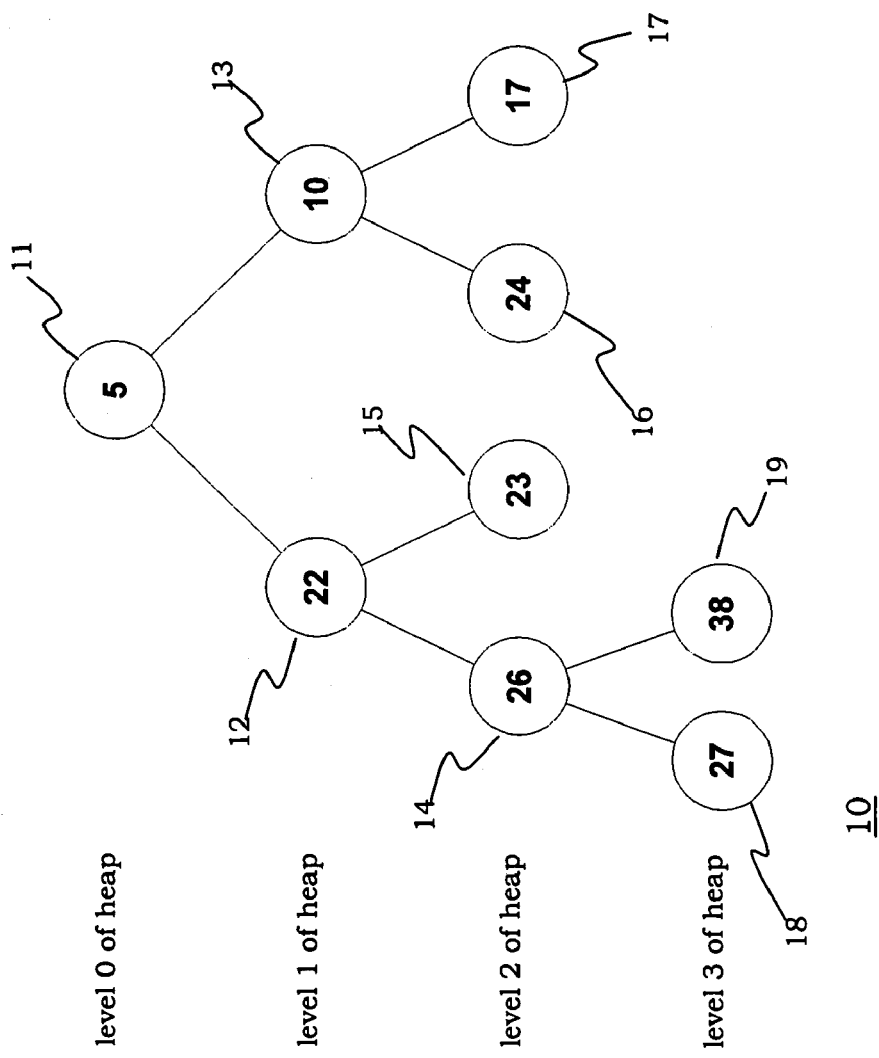
FIG. 1 is a conventional architectural diagram illustrating a tree-based heap data structure.
Figure 2:
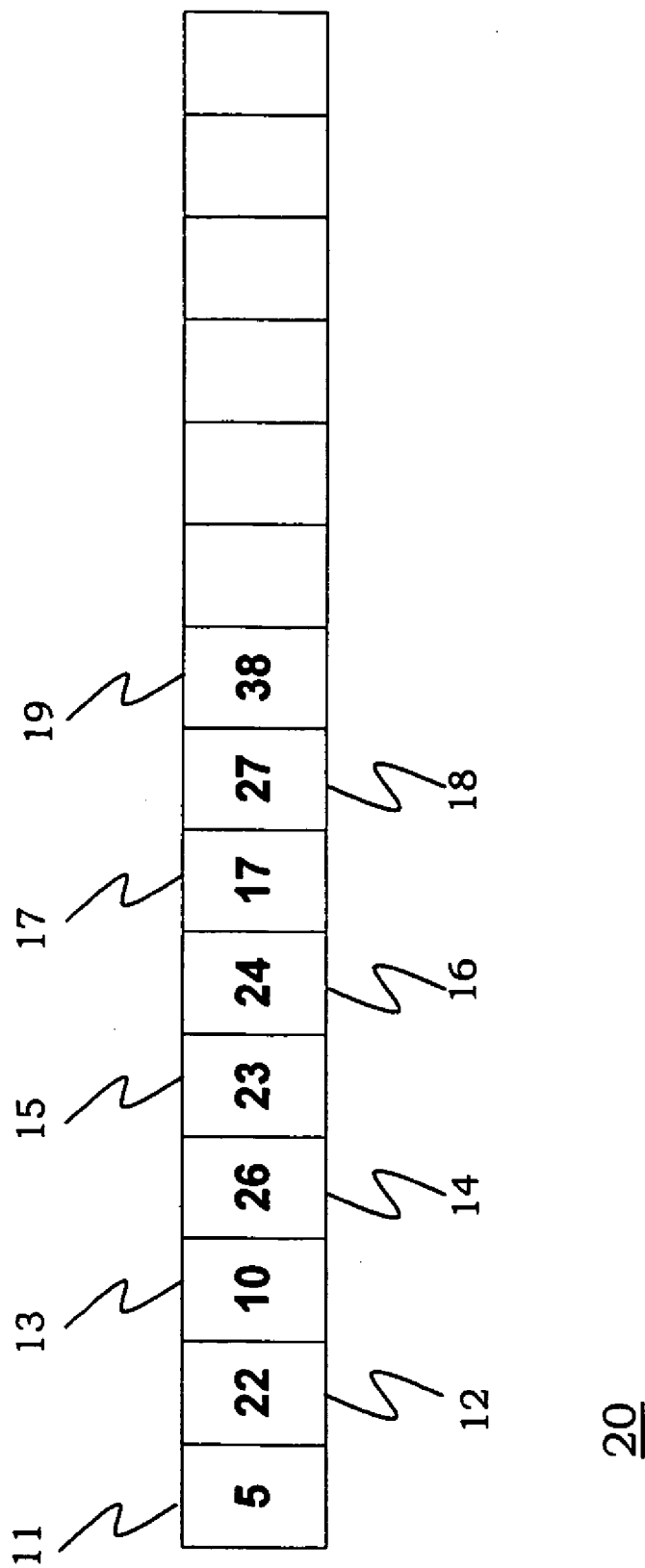
FIG. 2 is a conventional architectural diagram illustrating an array-based heap data structure.
Figure 3:
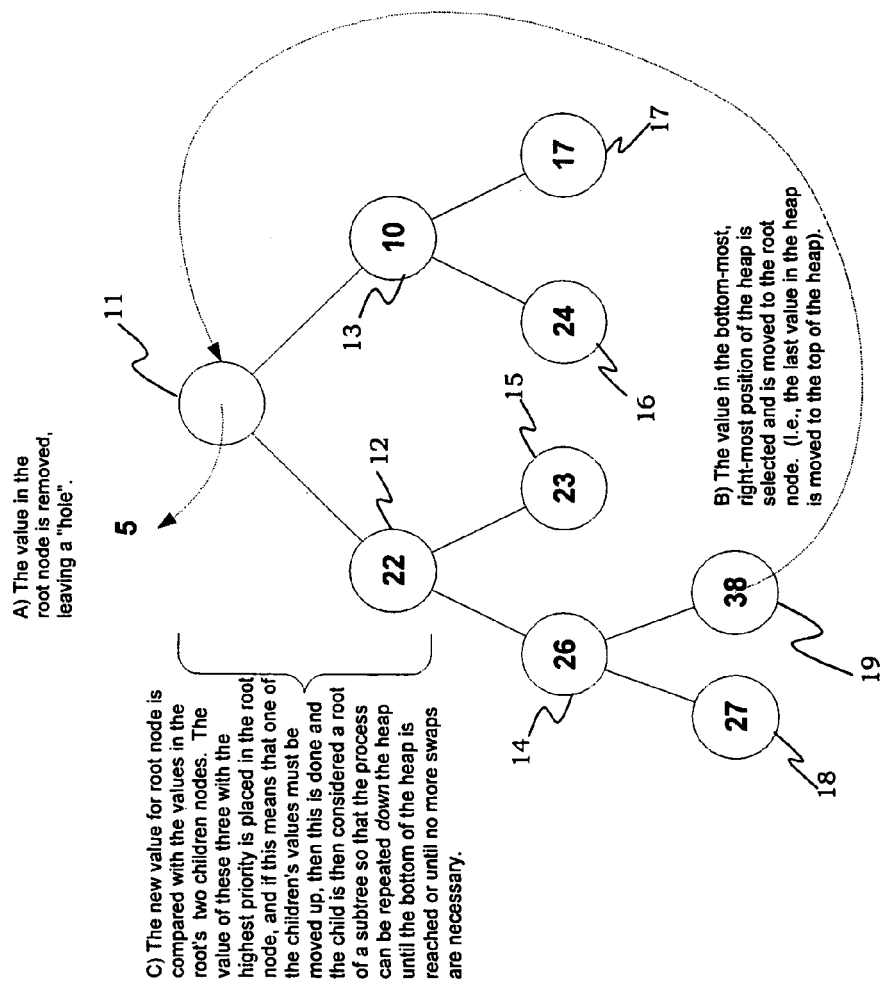
FIG. 3 is a conventional flow diagram illustrating the process of a heap remove operation.
Figure 4:
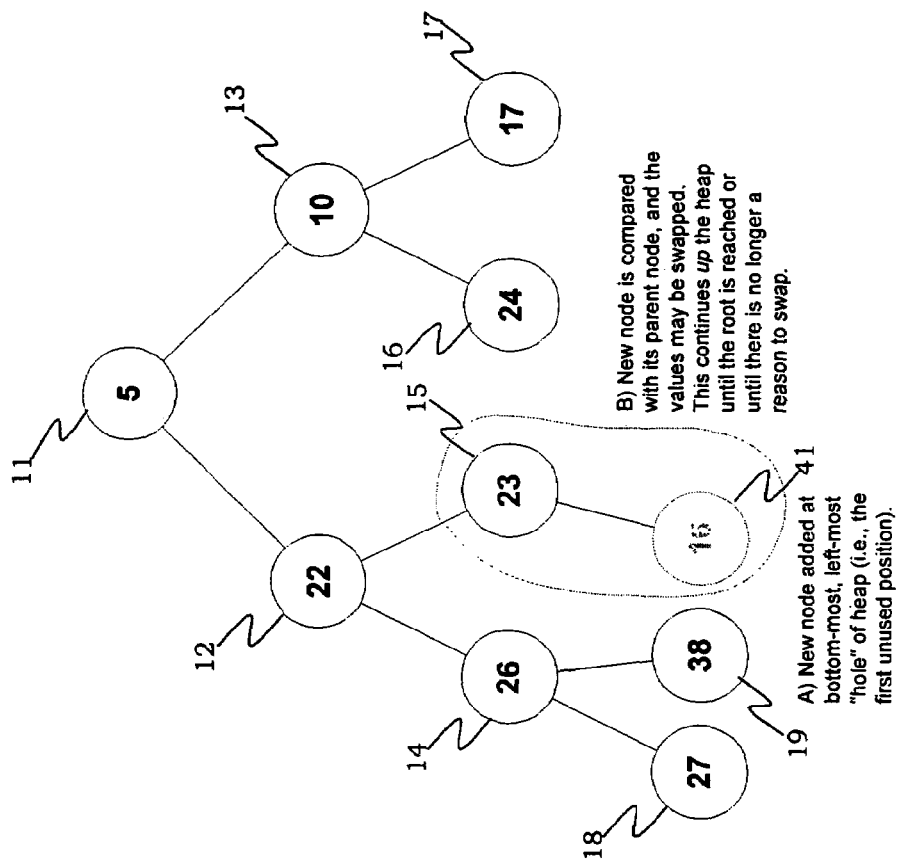
FIG. 4 is a conventional flow diagram illustrating the process for a heap insert operation.

Several aspects of piles are described below, which include heap remove operation, heap insert operation, combining an array implementation and a pointer implementation, a supernode structure, hole counters, multiple memory systems to construct a pipelined implementation of a heap-like data structure, multiple comparators to construct a pipelined heap implementation, and a pipelined heap with random commands, and a level cache to increase pipelined heaps processing.

1. Alteration of the heap remove operation, such that a hole may be percolated down the heap, with each hole behaving as the lowest priority value in the heap, and such that the hole may reside in any leaf position of the heap. The term leaf position applies equally well to an array-based implementation of a heap.
2. Alteration of the heap insert operation, such that the percolate operation operates on the heap data structure in a top-down rather than a bottom-up fashion, and such that the path followed by the percolate operation is not required to lead towards the first unused position in a traditional heap.
3. Using a combination of an array implementation and a pointer implementation of a heap to allow multiple dynamically-allocated pipelined heaps to co-exist within the same set of memories in an optimal fashion.
4. Combining nodes into a structure known as a "supernodes". A supernode is a set of $k^2$ sibling nodes from a k-ary tree, where k>=2; and where each supernode requires only k pointers to the next tree level when a pointer implementation of a heap used.
5. Use of counters at each logical or physical pointer that count the number of holes that appear in the data structure referenced by the logical or physical pointer. These counters are known as "hole counters": hole counters guarantee a bounded-depth heap and they aid in dynamically resizing the heap.
6. A method that uses hole counters to aid in dynamically resizing the heap.
7. Use of multiple memory systems to construct a pipelined implementation of a heap-like data structure, where a memory system or a collection of memory systems represent a level or multiple levels of a heap-like data structure and where these memory systems may be accessed simultaneously.
8. The use of multiple comparators to construct a pipelined implementation of a heap-like data structure, where a comparator, or collection of comparators represent a level or multiple levels of a heap-like data structure and where these comparators may be actively doing work simultaneously.

9. Construction of a pipelined heap implementation capable of random mixture of insert, remove, and swap commands.

10. Use of a "level cache" to increase the speed of pipelined heaps beyond the point at which they would otherwise lose coherency.

Heap Remove Operation

A heap's remove operation requires that the last used position in a heap be constantly tracked so that the remove operation can find the last used position. The value in the last used position is used to replace the value removed from the root node.

This invention discloses a heap remove operation that entails allowing the hole itself, caused by removing the value in the root node, to percolate down the heap to any arbitrary leaf-node position. A hole is treated as the lowest priority value in the heap, with a priority equal to that of all other holes.

Since the heap does not grow in size when the removed value is replaced with a hole, the heap's overall depth remains bounded at a maximum of $\log_k(N)$. However, the heap no longer satisfies property P4.

Since a hole is placed in the root node rather than a non-hole value from the bottom of the heap, there is no point in tracking the last used position of the heap.

Since a hole is considered to have the lowest priority in a heap, after the percolate operation is complete, a hole resulting from a delete operation will always reside in a leaf node of the tree.

Heap Insert Operation

A fast implementation of a heap is to have all the operations performed on the heap to access the levels of heap in the same order, either top-to-bottom or bottom-to-top. Note that the remove operation accesses the heap in top-to-bottom order. Rather than target only the bottom-most, left-most hole, the insert operation in the present invention may target any hole in the heap. This allows an insert operation to access levels of the heap in a top-to-bottom order.

Creating Multiple Heaps Using an Array and Pointer Implementation

In a pipelined heap, it is advantageous to place different levels of the heap in different RAM systems. The fact that there are several RAMs rather than one does not impede an array-based implementation of a heap, as apparent to one skilled in the art.

An array-based implementation, however, has the disadvantage of being less flexible than a pointer based implementation since the various nodes may be easily rearranged in a pointer implementation simply by changing the pointers. An array-based implementation uses a fixed algorithm to determine parent and child nodes. This loss of flexibility makes it difficult to instantiate multiple heaps in the same memory system and further allow these instantiated heaps to grow and shrink in size (number of nodes) during the lifetime of the heaps.

A pointer-based implementation requires more memory than an array-based implementation since the pointer must be stored. A pointer-based implementation requires more time to traverse the heap than an array-based implementation since pointers may point to any given node in the memory system. This makes it difficult or impossible to guarantee that a long read, such as a DRAM burst, or such as is inherently possible with very wide bit memories, will read multiple nodes that are of immediate use to the heap algorithm.

Figure 5:
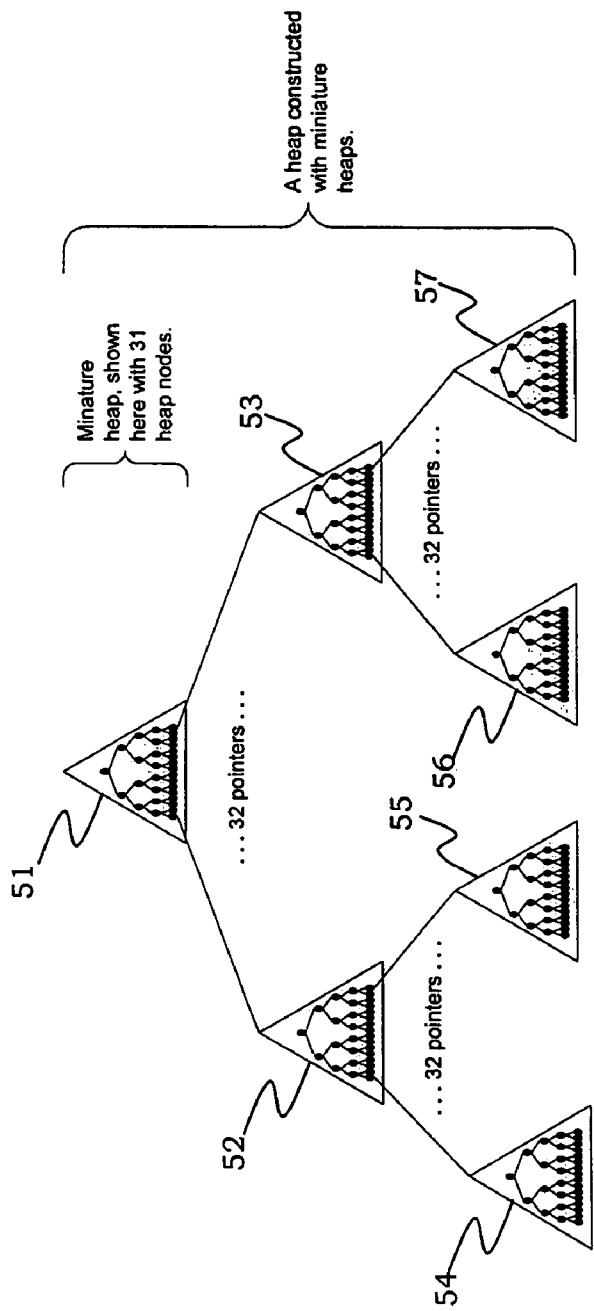
FIG. 5 is an architectural diagram illustrating heaps that are constructed from miniature heaps in accordance with the present invention.

To achieve the desirable properties of both array-based and pointer-based implementations in the same implementation, a combined structure may be used. FIG. 5 is an architectural diagram 50 illustrating heaps that are constructed from miniature heaps 51, 52, 53, 54, 55, 56, and 57. This structure groups nodes together into miniature heaps and stores them in an array along with a series of pointers to the child (and possibly parent) miniature heap. The location of each array in memory may then be random.

This arrangement of the heap data introduces a new level scheme. Rather than counting logical levels of single nodes, levels of miniature heaps can be counted. Each of these levels can be placed in a single RAM system to allow parallel pipelined access.

Supernodes

A further refinement can be made to miniature heaps, which are shown in an architectural diagram 50 as shown in FIG. 5. The miniature heaps are just that: heaps. This means that when a value is inserted or removed, the nodes that exist within a miniature heap must be shuffled around to satisfy the heap property P3.

To avoid this shuffling of values, a new structure is used. Like the miniature heap structure, a group of nodes are co-located in memory such that the nodes may be read with a single long or wide read. However, the nodes that are grouped together out of the traditional heap are different than the previous case.

The nodes grouped together are $k^2$ ( sibling nodes from k parents. The exception to this is tree root, which may be k nodes; or the exception to this is the tree root and next level, which may be a single node and k nodes, respectively.

Figure 6:
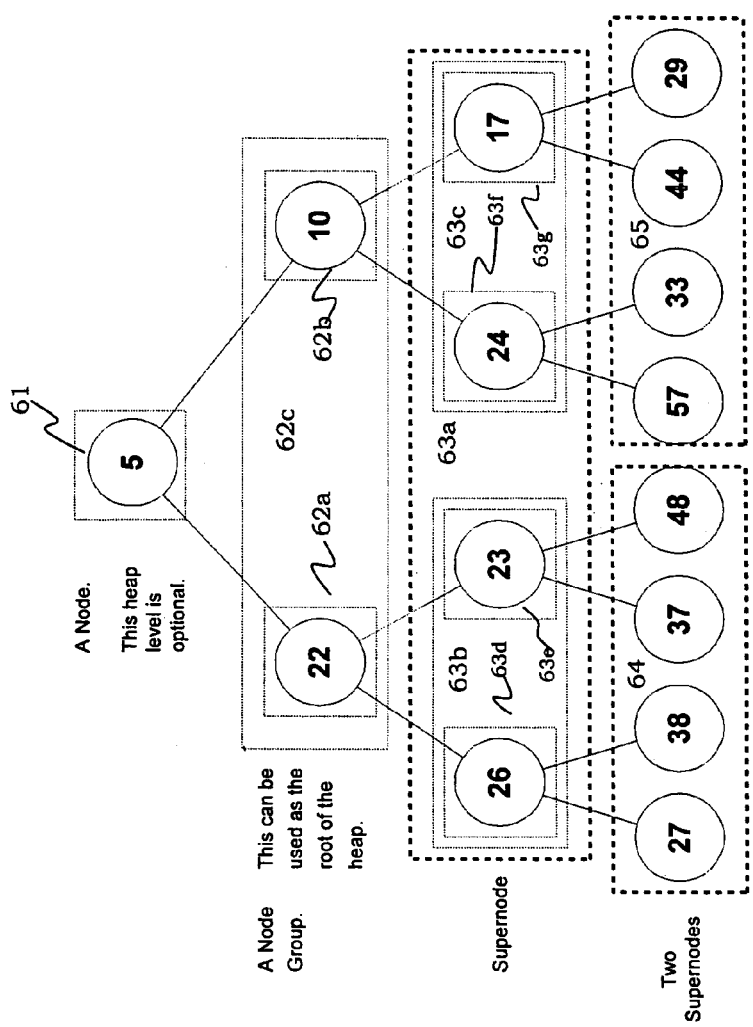
FIG. 6 is an architectural diagram illustrating a partitioning of a binary heap into supernodes with exceptions at the root in accordance with the present invention.

FIG. 6 is an architectural diagram 60 illustrating a partitioning of a binary heap (k=2)_into supernodes with exceptions at a root node 61. Nodes 62a and 62b forms a node group 62c. Two node groups make up a supernode. Optionally, the node group 62c can operate as the root of the heap. A supernode 63a includes two node groups of 63b and 63c, where the node group 63b contains nodes 63d and 63e, and the node group 63c contains nodes 63f and 63g. In the bottom level of heap, two supernodes 64 and 65 are constructed.

The $k^2$ nodes in a supernode are arranged as k "node groups" each with k child nodes from a unique parent, and where each node group has an associated pointer to its child supernode. Note that the position of a node in a node group is related to the position of the node's child node group in a supernode.

This arrangement of nodes means three things: the potential of long and/or wide memory can be used since, for example, only one read must be performed to retrieve all the siblings of k nodes; heap percolate operations do not have to be performed within one of these blocks of memory; and fewer pointers are required than in the case of miniature heaps.

In summary, the idea behind supernodes is also that supernodes are a set of node groups placed in "adjacent" memory, such that either a wide read or a burst read will return the entire supernode. However, k-1 of the node groups in the supernode are not needed by the heap or pile operation (insert, remove, or swap) currently being executed: these k-1 node groups are for other paths down the heap that will not be traversed by the operation currently being executed. The supernode structure allows an operation to speculatively read data that it might need, before it knows exactly what it does need. This results in faster heap or pile operations because the required time to retrieve data from memory can pass in parallel with some of the heap algorithms. The data that the operation does need is typically ensured to be there but there is additional data that is not needed at that point in time. Thus, a supernode is not just an arbitrary block of $k^2$ nodes. It is a block of k node groups, each with k nodes. The k node groups are siblings of each other in the heap, and only one sibling is needed for any given path through the heap. In other words, supernodes are arranged in a data structure for speculatively reading children in a heap before the exact child is known.

This supernode structure is distinctly different from speculative reads in conventional heap implementations. In a conventional implementation the values that have been speculatively read are required to determine which values to keep. This means that the work of reading the data and the work of determine which data to keep cannot be done in parallel. With supernodes, the work can be done in parallel.

Figure 7:
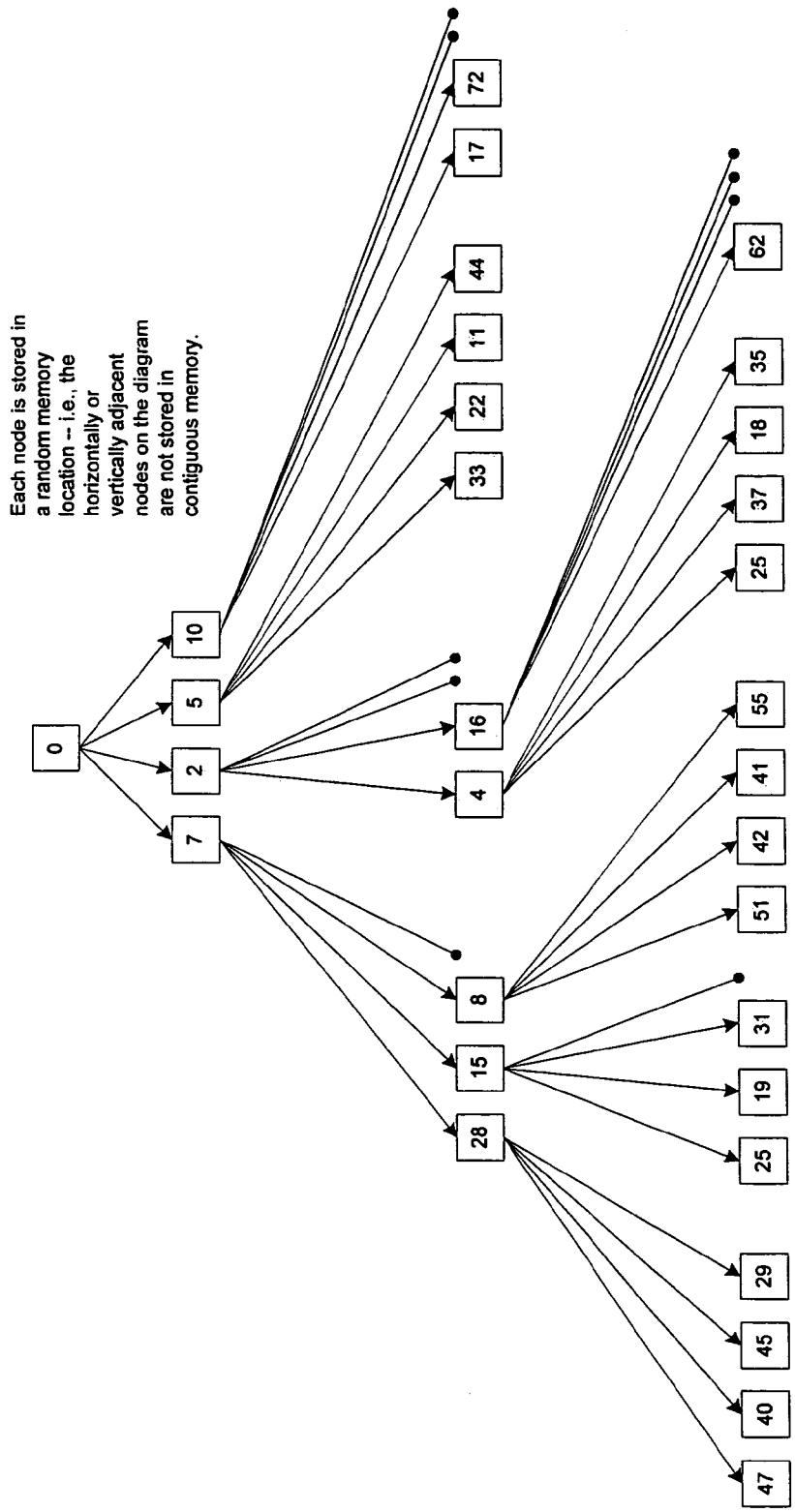
FIG. 7 is an architectural diagram illustrating a four-way heap that allows holes to percolate in any leaf node in accordance with the present invention.
Figure 8:
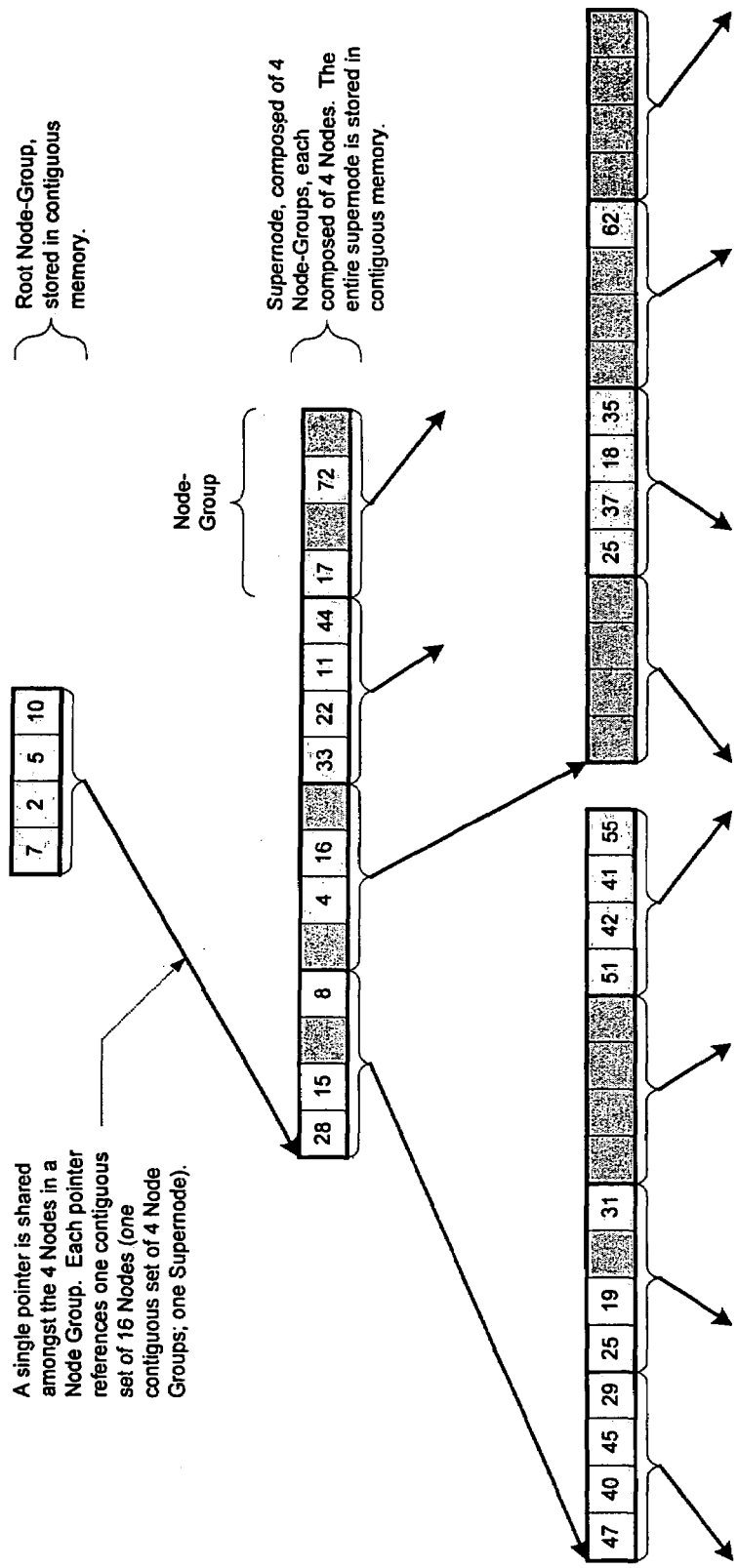
FIG. 8 is an architectural diagram illustrating a four-way heap constructed with supernodes in accordance with the present invention.

A k-ary heap (where k=4) that allows holes in any leaf position is shown in FIG. 7. FIG. 8 is an architectural diagram illustrating the same four-way heap, but constructed with supernodes. The supernode version of the heap is constructed using a node group for the root rather than a single node. This means that the maximum storage capacity of the heap with supernodes is one less than the other heap.

The remove operation for such a heap is as follows. This assumes that a k-way root node is used. Modification to derive the case for a single root node is obvious.

The root node group is read and the highest priority node is found and replaced with a hole. The value may be found by a k-way comparison. Since a node group has a pointer to its child supernode, the child supernode may be pre-fetched before the comparisons are started.

Once the comparisons are complete and the child supernode has been read from memory, (k-1) of the child node groups within the supernode may be discarded. The (k-1) child node groups were retrieved only to ensure that regardless of the result of the comparison on the root node, the correct child node would be available.

The remaining one node group of the supernode is examined to find the highest priority node. Also, since the node group has a pointer to its child supernode, the supernode may be pre-fetched before the comparison is started. The highest-priority value is exchanged with the hole in the parent node.

The remaining one node group is now treated as the root of a sub-heap, and the described steps repeat until the bottom of the heap is reached, or until the algorithm detects that a hole would be swapped with another hole.

The insert operation behaves similarly to the delete operation.

A different embodiment of the invention of supernodes entails keeping the values in a node group in sorted order to avoid comparisons during removal.

Use of Hole Counters at Each Logical or Physical Pointer

In a heap where holes are allowed, it becomes necessary to find these holes during an insert operation. An insert operation adds new values to a heap, and since a heap must abide by property P2 to give deterministic behavior, these values must occupy existing holes in the heap.

This invention describes a heap with holes that allows holes to occupy any leaf position. For an insert operation to ensure that a new value is swapped into a hole by the time percolation is complete, it needs to be able to find these "randomly" scattered holes.

In a pipelined implementation where each level of nodes (or miniature heaps, or supernodes) resides in a separate memory system, it is not productive to repeatedly read or write a level. Using a single bit at each pointer (or logical pointer in an array-based implementation) to indicate that there is a hole somewhere below in the heap does not solve the problem since an operation does not know whether to change the state of the bit until it much later determines the number of holes that are present in the sub-heap.

Instead, a counter can be associated with every pointer. This counter is an accurate representation of the number of holes in the sub-heap below the pointer. Because any insert operation will ultimately succeed once it traverses a non-zero counter, each counter may be decremented as the pointer is traversed. There is no need to return to the counter later to update it.

Similarly, during a remove operation, it is guaranteed that a hole will be created under every pointer that is traversed. Therefore each counter may be incremented as each pointer is traversed.

Use of Multiple Memory Systems in a Heap for Pipelining

Pipelining allows a second operation to start before the first operation is finished, analogous to an assembly-line process.

Heaps are difficult or impossible to implement in a pipelined fashion in hardware because many memory accesses need to be performed on the same memory system. This contradicts the very definition of pipelining, which states that each unit of work to be done is performed by a dedicated resource, independent from all the other resources required to perform the previous or remaining work.

To pipeline a heap, nodes for each level of the heap are allocated from a different memory system. This allows one operation to be accessing one memory system whilst a subsequent operation is accessing another memory system.

Figure 9:
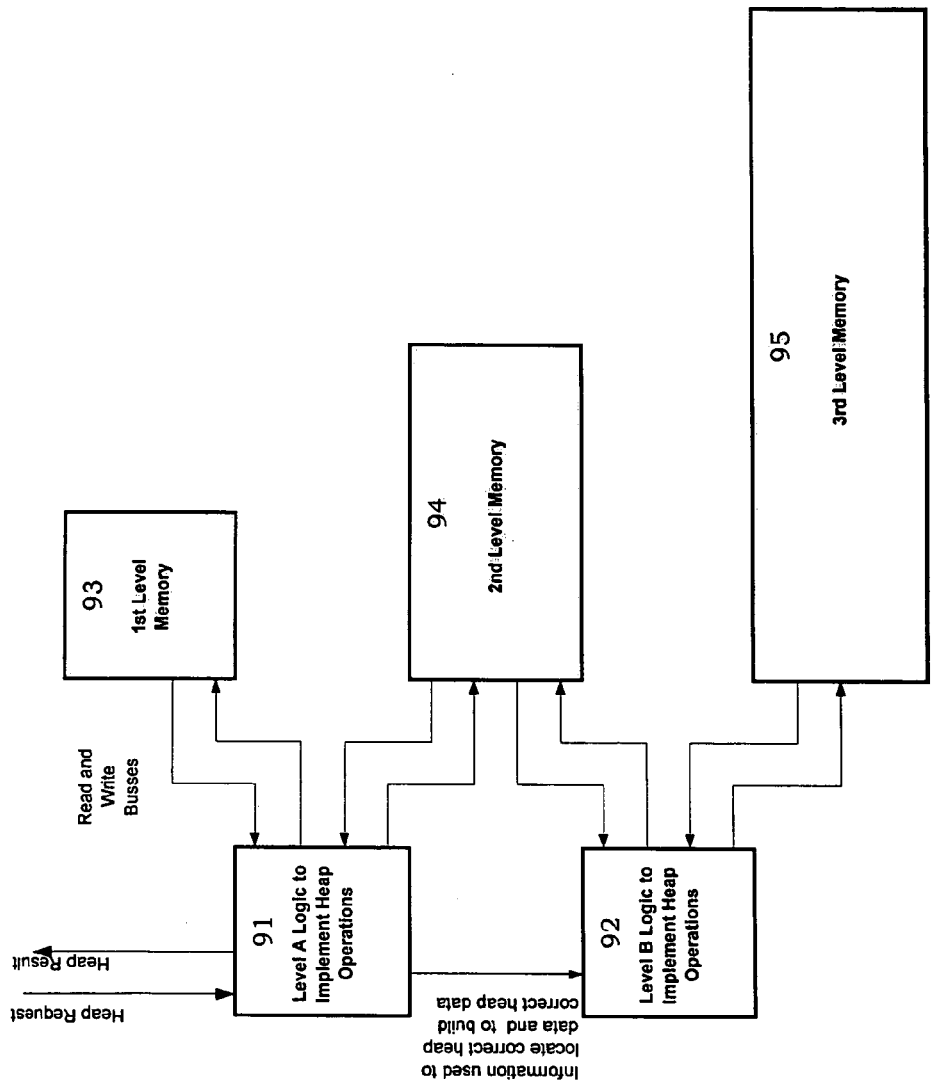
FIG. 9 is an architectural diagram illustrating a pipelined heap implementation in accordance with the present invention.

However, the percolate operation swaps two values from two adjacent levels, so each stage in the pipeline requires access to two memory systems. The logic and RAM systems are laid out as shown in an architectural diagram 90 in FIG. 9

This arrangement allows an application to complete $\log_k$ (N) more operations per second than previous implementations. For example, a 4-way pipelined pile realizes a five times speedup over a 4-way traditional heap when 1000 entries are sorted. Alternatively, this arrangement allows the memory to run at $1/\log_k(N))$ times the speed of a single memory system, and maintain the same number of completed operations per unit time. Memories that operate at lower speeds are typically cheaper than memories that operate at higher speeds.

The diagram and text show that each memory contains one level of a pipelined heap in a first level memory 93, a second level memory 94, and a third level memory 95. Level A logic 91 reads and writes both the first level memory 93 and the second level memory 94. Level B logic 92 reads and writes both the second level memory 94 and the third level memory 95. Level A logic 91 can send information to level B logic 92 so that values can be percolated through the memories of the data structure in a top-to-bottom order. Note that a memory that operates at twice the speed as the other memories, for example, may support twice the number of heap levels. Such arrangements are included in this claim.

Because of inability to pipeline a heap, the only reason to place different tree levels of the heap in separate physical memories in a conventional design is to create a larger heap. However, placing the different tree levels of the heap in separate physical memories in a pipelined implementation is another feature in the present invention.

Furthermore, it should be noted that using several memory systems for the purposes of pipelining applies equally well to heaps constructed in other means, such as via miniature heaps and via supernodes. However, these examples are intended to be illustrative, and do not limit the scope of the present invention. An example pipeline resource diagram 100 is shown in FIG. 10. After heap request "A" (either an insert, remove, or swap operation) is read from Level 1 RAM in the first cycle, heap request "B" (either an insert, remove, or swap operation) is then pipelined and read during the seventh cycle. If a pipelined operation was not present, an arbitrary heap request "B" could not start until the eleventh cycle, the time when heap request "A" is fully complete. The time at which heap request "B" could start increases as the number of levels in the heap increases, and therefore increases as the number of values to sort increases.

Use of Multiple Comparator Blocks in a Heap for Pipelining

Figure 11:
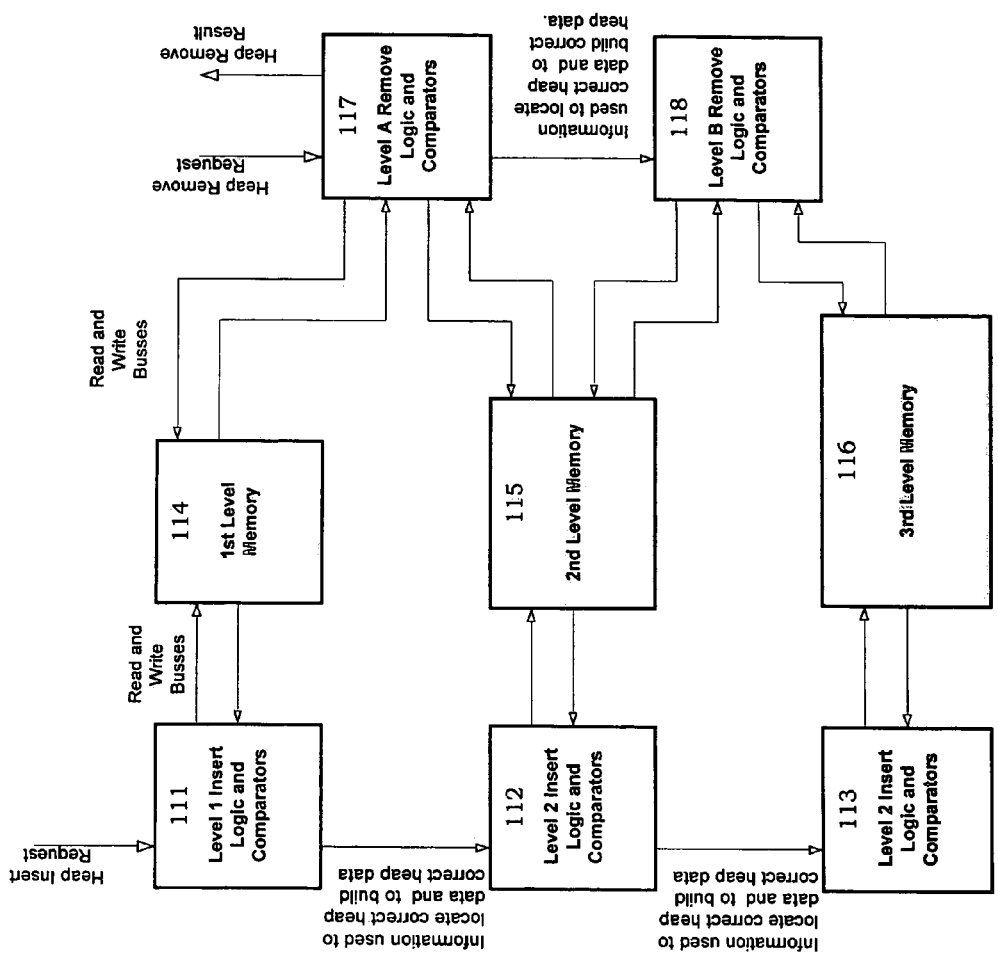
FIG. 11 is an architectural diagram illustrating a multiple comparator blocks in a pipelined heap in accordance with the present invention.

FIG. 11 is an architectural diagram 110 illustrating a multiple comparator blocks in a pipelined heap. Each memory system 114, 115, and 116 is associated with a respective block of comparators 111, 112, or 113. Insert logic and comparator blocks 111, 112, and 113 include of k comparators that examine the k hole counters in a node group. Depending on the desired insert algorithm, the left-most hole counter, the right-most hole counter, or the largest hole counter, or the smallest hole counter could be chosen as the winner of the k comparisons. The winning hole counter is used to direct the percolate operation down the heap.

The block further includes either k or one comparators that compare the value to be inserted with either the k node values or with the 1 winning node value. When k node values are compared, it should be understood that only the result of 1 comparison is kept: the result that corresponds to the winning hole counter. The winner of the value comparisons determines whether or not the new value to be inserted must be swapped with an existing value in the node group.

If the values are swapped, the new values is in the node group and the old value has been removed from the node group. The old value is given to the comparator block at the next level in the heap, and the procedure repeats.

The diagram shows "remove" comparator blocks 117 and 118. These blocks each consist of k comparators that examine the k node values in a node group. The value with the highest priority is selected and removed from the node group. The value to be removed corresponds to a node group at the next level in the heap. The comparator block associated with that new level will fill the hole created at the original level with the winning value. This repeats down the heap.

Construction of a Pipelined Heap with Random Operations

There is no pipelined hardware implementation of a conventional heap that is capable of supporting a random mixture of insert, remove, and swap operations without stalling the pipeline to wait for an operation to complete. E.g., a heap that is not uni-directional, like the heap invented herein, needs to complete fully a series of insert operation before a remove operation can begin, although it may be possible to pipeline a series of like operations.

A pipelined heap implementation such as that shown in FIG. 11 is capable of a random mixture of any or all of insert & remove; insert & swap; remove & swap, and; insert, remove & swap.

Use of a Level Cache

The execution speed of a pipelined implementation of a heap that uses multiple comparator blocks and multiple memories is limited by the speed of the memories.

Behaviour of the Insert Operation

In this implementation, each insert request performs a memory read to retrieve a supernode. (At the root node and second tree level, only portions of supernodes need to be read). As previously described, a node group is isolated and comparisons are performed. A swap of the new value and a value in the node may be performed, altering the contents of the node group. The new node group must then be written back to memory. The memory system associated with the next level of the heap is then accessed, repeating the above operations.

This means that if the memory runs at X operations per second, X/2 insert operations per second can be completed.

Behaviour of the Remove Operation

In this implementation, each remove request performs a memory read to retrieve a supernode. A node group is isolated and comparisons are performed. A value to be removed is identified. At the root level, this value is returned to the initiator of the remove operation.

Removing the value leaves a hole. The altered node which now contains the hole need not be written back immediately. Recall that only a read has been performed so far. The next level supernode can be read, and the same steps are followed until a winning value is determined. This value is used to write back the original node group.

The sequence of events is in a four-level heap is as follows:
1. Read Level 1
2. Find Winner in Level 1
3. Read Level 2
4. Find Winner in Level 2
5. Write Level 1, using winner from Level 2
6. Read Level 3
7. Find Winner in Level 3
8. Write Level 2, using winner from Level 3
9. Read Level 4
10. Find Winner in Level 4
11. Write Level 3, using winner from Level 4
12. Write Level 4, containing a hole in place of the winner of Level 4

Thus, each memory system is accessed only twice, and a memory running at X operations per second is capable of X/2 heap remove operations per second.

Implications of the Above, and the Use of a Level Cache

Note that the time between reads and writes to the same memory, especially in the remove operation, is long. Comparisons need to be done to find the winner, and as memory speeds increase the time to perform these comparisons is significant. Because of this delay between the reads and writes, it is possible that an operation (operation 1) following another operation (operation 2) will read the same node group from memory that operation 1 is modifying, but has not yet written back in to the RAM. Operation 2, therefore, receives a stale copy of the data.

This problem may be solved either by reducing the rate of heap operations, or by increasing the speed of the memory. Either way, the theoretically maximum rate of x/2 heap operations per second cannot be achieved. Another way to solve the problem is run the comparison operations faster. However, this can be expensive and technologically challenging when the speed required challenges the state of art for logic design and manufacturing.

One way to solve the problem is to implement a cache for node groups read from memory. When operation 2 accesses the same node group that operation 1 is modifying, operation 2 retrieves the data from the cache rather than from the memory. Because there is latency between the start of a read memory operation and the time at which the retrieved data is available, there is adequate time to consult the cache, and adequate time for operation 1 to complete its modifications to the cache. The X/2 rate can be achieved with low comparison speeds even as the memory speeds increase.

The size of the cache is practical from an implementation standpoint. To allow any combination of requests that access the same nodes repeatedly, the cache depth only needs to have one entry per level. This is because requests need to be serviced sequentially in a heap to ensure correct data is available at all times, and therefore one request must finish modifications to a level before another request uses the data in that level.

This aspect of the invention also includes, however, different caching structures that contain more than one entry per level. This can be useful when statistical gain is exploited for higher performance. Recall that the cache is required when the node for one level is being modified but has not been committed to memory, and another request attempts to read that node from memory. If the length of time an implementation consumes to compute the "winners" for a level is long, the implementation can still use a high request rate and know (or hope) that the dynamics of the system are such that requests which are close in time will not typically access the same set of nodes. Accessing the same node "too soon" would force cause the request completion rate to temporarily slow down while the implementation waits for the nodes to have stable information.

Figure 12:
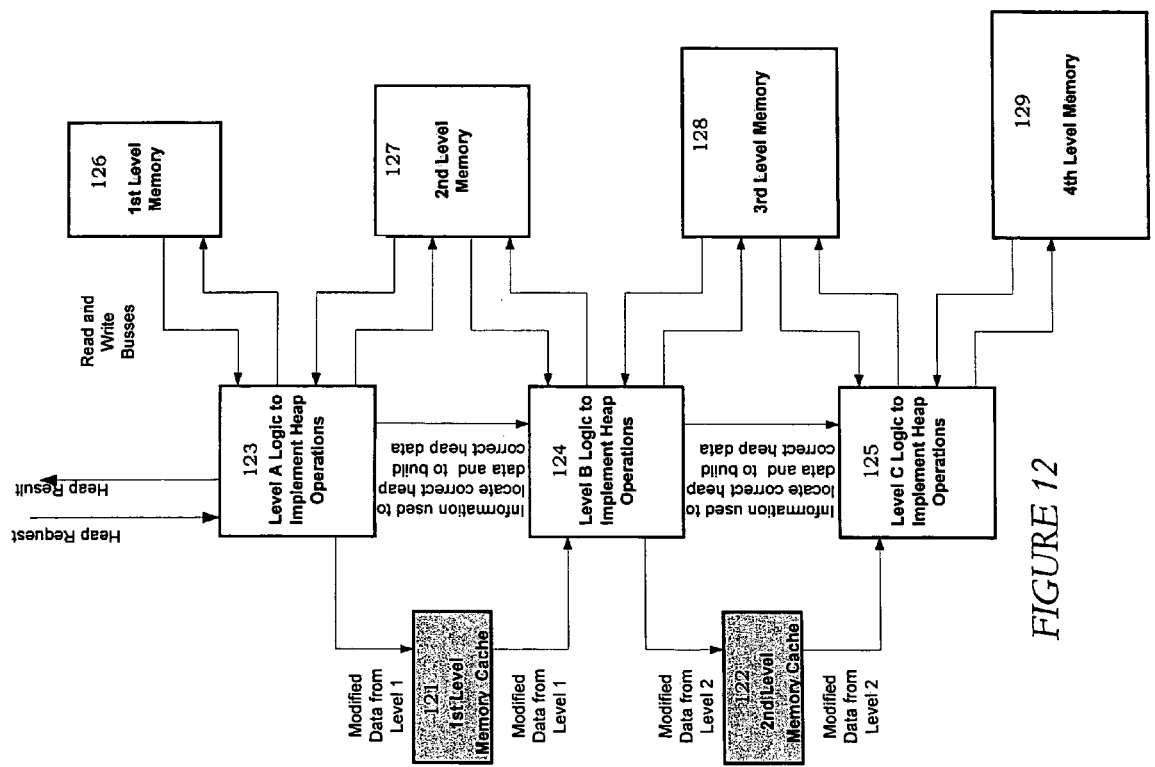
FIG. 12 is an architectural diagram illustrating a pipelined heap with level caches in accordance with the present invention.
Figure 13:
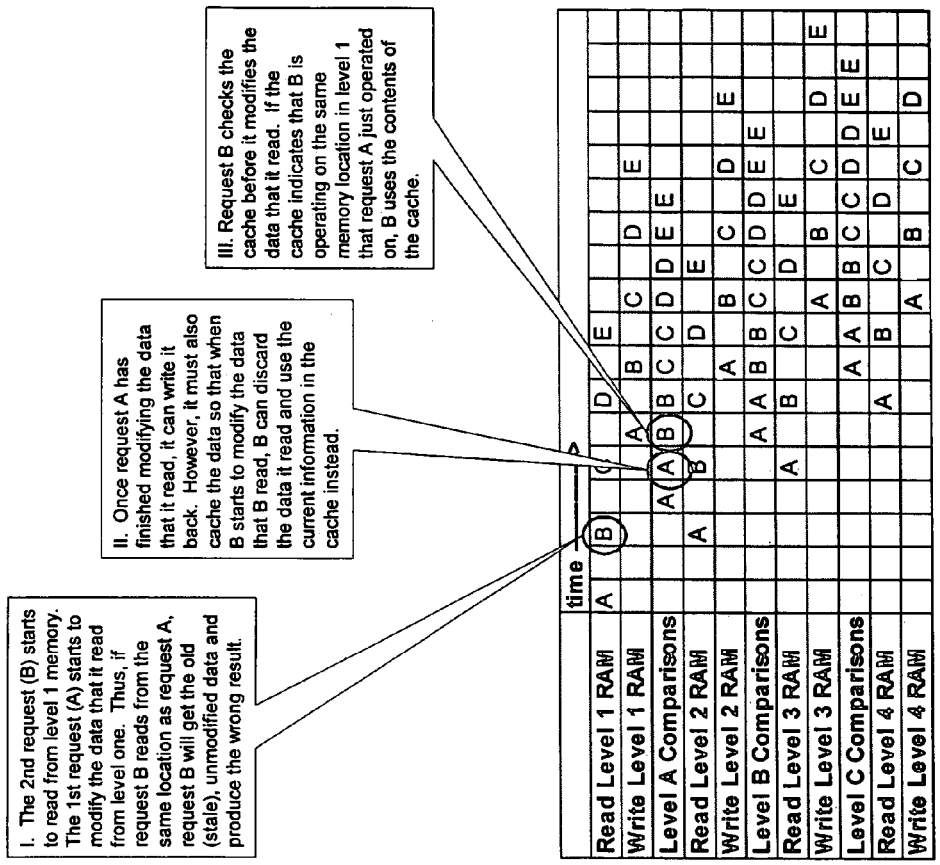
FIG. 13 is an architectural diagram illustrating a resource diagram showing use of level caches in accordance with the present invention.

In such a scheme many requests are being processed between a read from level n and a write to level n, many nodes must be cached. FIG. 12 is an architectural diagram 120 illustrating a pipelined heap with level caches, while FIG. 13 is an architectural diagram illustrating a resource diagram 130 showing use of level caches. A first level memory cache 121 is placed between a level A logic 123 and a level B logic 124. A second level memory cache 122 is implemented between the level B logic 124 and a level C logic 125. The first and second level memory caches 121 and 122 speedup the overall processing performance. On the other side, the level A logic 123 communicates information with a first level memory 126 and a second level memory 127, the level B logic 124 communicates with a second level memory 126 and a second level memory 127, and the level C logic 125 communicates with a first level memory 126 and a second level memory 127

The above embodiments are only illustrative of the principles of this invention and are not intended to limit the invention to the particular embodiments described. For example, one of ordinary skill in the art should recognize that the supernode concept can be selected as k node-groups, in which k denotes the number of optimal node-groups to suit a particular design. Accordingly, various modifications, adaptations, and combinations of various features of the described embodiments can be practiced without departing from the scope of the invention as set forth in the appended claims.

We claim:

1. A heap data structure comprising:
   a root level having a node group, the node group having k number of nodes, each of the k number of nodes sharing a pointer, each of the k number of nodes stored contiguously in memory; and
   a second level having one supernode, the supernode having k number of node groups, each of the k number of node groups includes k nodes, the k nodes of the supernode being stored contiguously in memory, wherein the pointer references the contiguously stored k nodes of the supernode.

2. The data structure of claim 1, further comprising a hole as a k node, the hole representing an absent value.

3. The data structure of claim 1, wherein the k number of node groups are siblings of each other, such that only one sibling node is needed for any given path.

4. The data structure of claim 1, wherein the root level node group is stored in a separate memory from the second level supernode, thereby enabling simultaneous access to the root level node group and the second level supernode.

5. The data structure of claim 4, wherein each memory is associated with a corresponding comparator block, each comparator block configured to holes within node groups.

6. The data structure of claim 1, further comprising:
   a third level having k number of supernodes, each of the k number of supernodes of the third level having k number of node groups, each of the k number of node groups includes k nodes, wherein the k number of supernodes of the third level are referenced to the second level by k pointers associating each one of the k number of node groups of the second level to a corresponding one of the k number of supernodes of the third level.

7. The data structure of claim 2, further comprising a remove or delete operation which does not require a last value to be moved into a root node.

8. The data structure of claim 7 wherein the remove or delete operation comprises:
   removing a value from the root node; and
   percolating the hole associated with the removal of the value from the root node down the data structure.

9. The data structure of claim 7, wherein the data structure contains a hole counter that counts a number of holes below the pointer, the hole counter being associated with the pointer, the hole counter representing the number of holes in the supernode below the pointer.

10. The data structure of claim 9, wherein the remove operation comprises incrementing the hole counter associated with the pointer when the pointer is traversed.

11. The data structure of claim 2, further comprising an insert operation for percolating a value to be inserted starting at the root level and proceeding towards the bottom level.

12. The data structure of claim 10, wherein an insert operation comprises:
   percolating a value to be inserted starting at the root value;
   in one or more pointers, each pointer being associated with a hole counter that tracks the number of available holes, percolating the add value down a node in which the hole counter contains a value greater than zero; and
   decrementing the selected hole counter by one.

13. The data structure of claim 1, wherein an insert operation and a remove operation access the data structure in a top-to-bottom order.

14. A memory structure for efficiently pipelining a heap data structure, the heap data structure having a root level defined by a root level node group and a second level having a supernode, the memory structure comprising:
   first and second memories, the first and second memories being separate physical memories, the first memory storing the node group of the heap data structure and the second memory storing the supernode;
   a pointer shared among multiple nodes of the node group to reference a contiguous set of nodes defining the supernode; and
   counters associated with the pointer, the counters configured to maintain a value representing a number of holes within a corresponding node group of the set of nodes, the counters further configured to be decremented each time the pointer is traversed.

15. The memory structure of claim 14, further comprising:
comparators associated with first and second memories, the comparators configured to examine holes within each node group through the counters, the comparators further configured to examine node values within each node group.

16. The memory structure of claim 14, further comprising:
a memory cache shared between the first and second memories, the memory cache configured to store node group values read from the first or second memories.

17. The memory structure of claim 14, further comprising:
a third memory storing a next supernode:

a third memory pointer pointing to the next supernode from a node group of the set of nodes defining the supernode.

* * * * *